(12) United States Patent
Henneberger et al.

(10) Patent No.: US 9,989,944 B2
(45) Date of Patent: Jun. 5, 2018

(54) TEMPERATURE CONTROL VOTING SYSTEM

(71) Applicant: Portable Comfort LLC, Glen Allen, VA (US)

(72) Inventors: John Henneberger, Glen Allen, VA (US); Michael Scelzi, Glen Allen, VA (US)

(73) Assignee: Portable Comfort Corporation LLC, Glen Allen, VA (US)

( * ) Notice: Subject to any disclaimer, the term of this patent is extended or adjusted under 35 U.S.C. 154(b) by 184 days.

(21) Appl. No.: 14/718,494

(22) Filed: May 21, 2015

(65) Prior Publication Data

US 2015/0338117 A1 Nov. 26, 2015

Related U.S. Application Data

(60) Provisional application No. 62/001,312, filed on May 21, 2014.

(51) Int. Cl.
*G05B 15/02* (2006.01)
*F24F 11/00* (2018.01)

(52) U.S. Cl.
CPC ...... *G05B 15/02* (2013.01); *F24F 2011/0061* (2013.01); *F24F 2011/0063* (2013.01);
(Continued)

(58) Field of Classification Search
USPC ........................................................ 700/227
See application file for complete search history.

(56) References Cited

U.S. PATENT DOCUMENTS 5,638,826 A 6/1997 Wolpaw et al.
6,358,202 B1 3/2002 Arent
(Continued)

FOREIGN PATENT DOCUMENTS

WO 2001007128 A1 2/2001
WO 2005024311 A1 3/2005
WO 2011072332 A1 6/2011

OTHER PUBLICATIONS

Feldmeier, M. et al., Personalized HVAC Control System, Presented at Internet of Things, Dec. 2010, Tokyo, Japan.
(Continued)

*Primary Examiner* — Emilio J Saavedra
(74) *Attorney, Agent, or Firm* — Banner & Witcoff, Ltd.

(57) ABSTRACT

A temperature voting system which receives votes indicating the temperature preferences of a plurality of occupants within a given HVAC zone, and adjusts a set-point temperature of a corresponding HVAC system accordingly. The votes may be received via a mobile device, an employee workstation, or from one or more biomedical devices. Each occupant may manually enter and submit a vote for their preferred set-point temperature, or a software application may be configured to automatically cast a vote for the corresponding occupant according to user-configurable preferences or current metabolic state. The received votes may be weighted according to a status of the voter, and aggregated to determine an appropriate set-point temperature. In some embodiments, near-field communication devices, GPS location technology, or other technology may be used to automatically detect the presence of an occupant within a HVAC zone and cast the occupant's vote for a corresponding HVAC zone.

16 Claims, 10 Drawing Sheets

(52) U.S. Cl.
CPC ............ *F24F 2011/0064* (2013.01); *F24F 2011/0068* (2013.01); *G05B 2219/2642* (2013.01)

(56) References Cited

U.S. PATENT DOCUMENTS

| | | | |
|---|---|---|---|
| 7,378,980 | B2 | 5/2008 | McFarland |
| 2003/0216838 | A1* | 11/2003 | Dudley ............... F24F 11/006 700/277 |
| 2006/0180647 | A1 | 8/2006 | Hansen |
| 2010/0204807 | A1* | 8/2010 | Isaacson ........... G05B 19/0426 700/28 |
| 2010/0262298 | A1* | 10/2010 | Johnson ............... F24F 11/001 700/277 |
| 2011/0127340 | A1 | 6/2011 | Aiken |
| 2012/0203453 | A1 | 8/2012 | Lundquist et al. |
| 2014/0045532 | A1* | 2/2014 | Fraccaroli ............. H04W 4/02 455/456.3 |
| 2014/0114567 | A1 | 4/2014 | Buchanan et al. |
| 2014/0207292 | A1 | 7/2014 | Ramagem et al. |
| 2015/0312696 | A1 | 10/2015 | Ribbich et al. |
| 2015/0320588 | A1 | 11/2015 | Connor |
| 2016/0062332 | A1 | 3/2016 | Call et al. |

OTHER PUBLICATIONS

Purdon, S. et al., Model-Free HVAC Control Using Occupant Feedback, Presented at Second IEEE International Workshop on Global Trends in Smart Cities 2013, Oct. 2013, Sydney, Australia.

Erickson, V. et al., Thermovote: Participatory Sensing for Efficient Building HVAC Conditioning, Presented at 4th ACM Workshop on Embedded Systems for Energy-Efficiency in Buildings, Nov. 6, 2012, Toronto, ON, Canada.

Comfy, Intelligent software for personalized comfort in the workplace, Retrieved from www.buildingrobotics.com on Apr. 29, 2015.

* cited by examiner

TEMPERATURE CONTROL VOTING SYSTEM

CROSS-REFERENCE TO RELATED APPLICATIONS

This application claims the benefit of priority to U.S. Provisional Application No. 62/001,312, filed May 21, 2014, the disclosure of which is herein incorporated by reference in its entirety.

FIELD OF THE DISCLOSURE

Aspects relate generally to a method, apparatus, system, and computer-readable media for controlling a building's HVAC system in response to the preferences of one or more occupants of the building.

BACKGROUND

Most commercial (e.g., office) buildings employ a full-time building engineer whose responsibilities include maintaining and adjusting the building's heating, ventilation, and air conditioning (HVAC) system in response to occupants' feedback. More particularly, these commercial buildings may have one or more HVAC zones within the building (e.g., office suites, individual floors, wings of the building, etc.) individually serviced by the HVAC system, and the building engineer may be responsible for adjusting the HVAC system to suit the occupants of the corresponding zone. For example, if the building engineer receives complaints from the occupants of a third floor of the building (as one example of an HVAC zone) indicating that they are too hot, the building engineer may turn on or adjust the air conditioning in order to lower the temperature of air supplied to the third floor. In contrast, if the building engineer receives complaints from the occupants of the third floor indicating that they are too cold, the building engineer may turn on or adjust the heating in order to raise the temperature of the air supplied to the third floor.

In this regard, much of the building engineer's day may be spent visiting various HVAC zones and addressing complaints regarding the air temperature therein. Further, the building engineer often may be required to arbitrate disputes between occupants of a given zone. That is, the occupants of a given zone may have differing opinions regarding their preferred air temperature for the zone. Accordingly, if the building engineer adjusts the HVAC to raise the air temperature of a given zone in response to a complaint from a first occupant indicating that the zone is too cold, the engineer may inadvertently displease a second occupant who finds the adjusted temperature too warm.

This traditional approach (i.e., adjusting the HVAC system in response to complaints of the occupants) results in an air temperature which may not be optimal because the building engineer is reacting to the complaints of a few occupants within the zone rather than determining a collective preference of all the occupants. Further, this approach may be inefficient because the building engineer is required to constantly adjust the air temperature up and down throughout a day in response to the varying preferences of the occupants.

Accordingly, there remains a need to provide a building engineer and/or an HVAC system with feedback in order to adjust the HVAC system to an optimal set-point temperature accordingly.

SUMMARY OF SELECTED INVENTIVE ASPECTS

According to aspects of the disclosure, a temperature control voting system is provided. The temperature control voting system receives votes indicating the temperature preferences of a plurality of occupants within a given HVAC zone, and adjusts a set-point temperature of a corresponding HVAC system accordingly. In some embodiments, the votes may be received via a smartphone application or the like used by each occupant. In other embodiments, the votes may be received via an employee workstation (e.g., a desktop or laptop computer) or from one or more biomedical devices worn by, implanted in, or detected via brainwave communication monitoring of an occupant. Each occupant may manually enter and submit a vote for their preferred set-point temperature, or the smartphone application may be configured to automatically cast a vote for the corresponding occupant according to user-configurable preferences. The received votes from each occupant may be weighted according to a status of the voter (e.g., entry level employee, senior employee, manager, owner, etc.), and aggregated to determine an appropriate set-point temperature. In some embodiments, near-field communication devices, GPS devices, and/or other technology may be used to automatically detect the presence and/or location of an occupant and cast the occupant's vote for a corresponding HVAC zone.

BRIEF DESCRIPTION OF THE DRAWINGS

A more complete understanding of the disclosure and the advantages thereof may be acquired by referring to the following description in consideration of the accompanying figures, in which like reference numerals in different figures indicate similar elements, and wherein.

DETAILED DESCRIPTION OF EXAMPLE EMBODIMENTS

Figure 1:
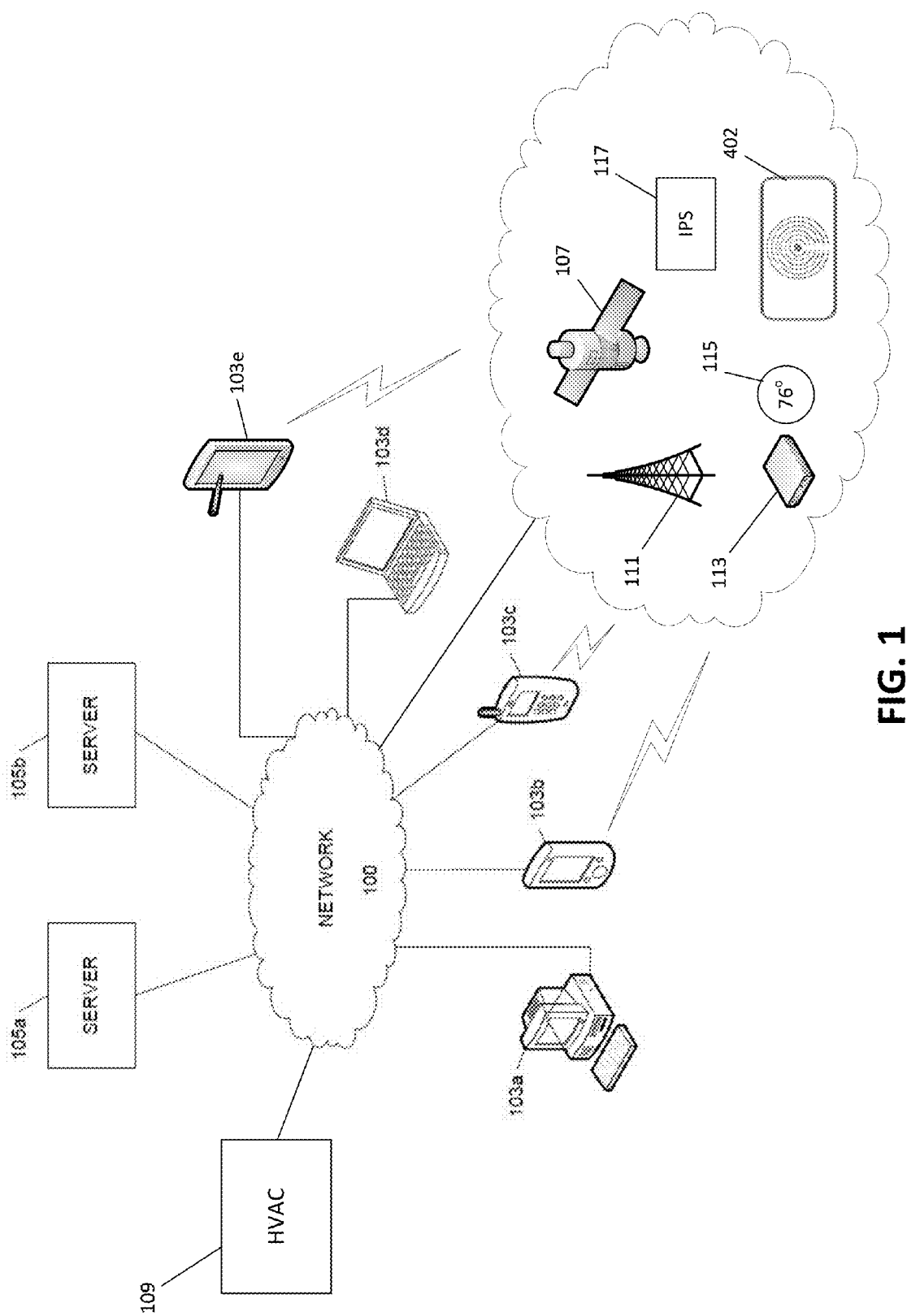
FIG. 1 is an example network environment in which one or more embodiments of the temperature control voting system for a corresponding HVAC system may be employed.

FIG. 1 illustrates a network environment in which an embodiment of a temperature control voting system according to aspects of the disclosure may be employed. The network environment includes a network 100 configured to provide communications between a variety of devices including client devices 103 and network servers 105. The communications may conform to one or more communication protocols including Internet Protocol (IP), Hyper Text Transfer Protocol (HTTP), File Transfer Protocol (FTP), and the like. The devices 103 may include stationary devices such as a personal computer (PC) 103a as well as mobile communication devices such as a personal data assistant (PDA) 103b, a mobile phone 103c (e.g., a smartphone), a laptop computer 103d, and a tablet 103e. The network servers 105 may be configured to store and host various types of information.

In some embodiments, an HVAC system 109 may be connected to the network 100. The HVAC system 109 may include hardware and software configured to heat and cool air supplied to one or more of the HVAC zones 400 of the building 300 as will be discussed more fully in connection with FIGS. 3-5. For example, in some embodiments the HVAC system 109 may include a forced air system which supplies heated or cooled air into the building 300 via ductwork provided therein in order to obtain a desired set-point temperature. This set-point temperature may be set via various controls provided at the HVAC system 109 (not shown) by a building engineer or the like, or may be set automatically in response to feedback received from the occupants of the building via the temperature control voting system as will be discussed more fully.

In some embodiments, one or more of the client devices 103 may be communicatively coupled to a global positioning satellite (GPS) 107, local Cell Towers 111, local Wi-Fi 113, Wi-Fi enabled thermostats 115, Indoor Positioning Systems (IPS) 117, and/or proximity receivers 402 (which will be discussed more fully in connection with FIGS. 4-6), which are also in communication with the network 100. In such embodiments, a location of a user using one or more of the client devices 103 may be determined via the GPS 107, Cell Tower 111, Wi-Fi 113, Wi-Fi enabled thermostat 115, IPS 117, and/or receiver 402. Furthermore, the collective positioning system (which includes wide area networks and/or self-healing grid(s) and/or widespread Wi-Fi) in any embodiment may be utilized to predict a user's travel patterns and define a control point based on travel patterns both historical and predictive. The outcome of the predictive analysis and historical analysis may be a specific action for the building systems; e.g., turn lights on in a user's office and/or set temperature for the user's office or area based on real time proximity positioning and proximity predictive analysis and subsequent positioning. The result will be an automatic algorithm tracking user's actual and historical patterns, defining arrival times at a user's building/home and effectuating/optimizing change in the built environment.

The client devices 103 may communicate with one or more of the servers 105 and/or the HVAC system 109 via the network 100. For example, the client devices 103 may be configured to run a software application which allows a user to communicate with a building engineer via a client device 103 used by the engineer, via one or more of the servers 105 which is accessible by the engineer, or via the HVAC system 109 and/or the thermostat 115 itself. For example, in some embodiments a user may use a smartphone application which allows her to cast a vote for the set-point temperature in her corresponding HVAC zone 400, and this vote may be communicated via the network 100 to a PC 103a accessible by the building engineer.

Additionally or alternatively, the software application may allow the user of the client device 103 to communicate directly with the HVAC system 109 and/or thermostat 115 without first communicating with a building engineer. For example, the user may use a smartphone application which allows her to cast a vote for the set-point temperature in her corresponding HVAC zone 400, and this vote may be communicated directly to the HVAC system 109 and/or thermostat 115 where it is processed by a controller or the like, such that the system 109 can be automatically adjusted in response to receiving one or more votes. In some embodiments, a plurality of occupants of a given HVAC zone 400 may vote for a desired temperature of the HVAC zone 400, and the HVAC system 109 and/or thermostat 115 may be configured to aggregate the received votes from the plurality of users and adjust the set-point temperature according the aggregated votes. For example, the HVAC system 109 and/or thermostat 115 may adjust the set-point temperature to a most popular temperature of the received votes, an average temperature of the received votes, etc.

Figure 2:
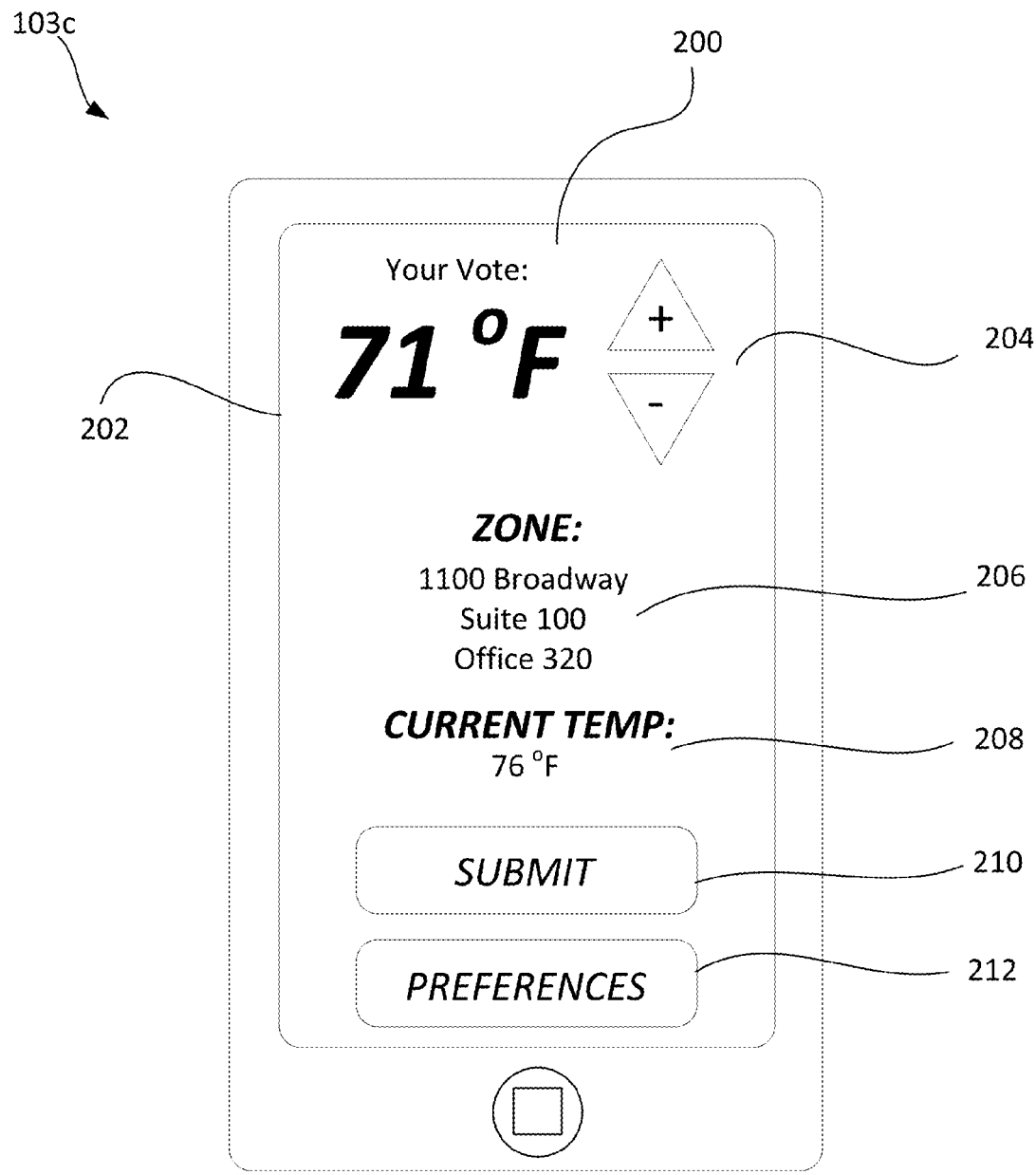
FIG. 2 is a mobile phone running a software application configured to submit a vote indicating a corresponding user's preferred set-point temperature for the HVAC system depicted in FIG. 1.

FIG. 2 illustrates one suitable example of a user interface 200 of a software application (e.g., a smartphone application) provided on a user's mobile phone 103c as one component of the temperature control voting system. The software application may communicate a user's vote for a set-point temperature to the building engineer and/or the HVAC system 109 and/or thermostat 115 directly. In this embodiment, the mobile phone 103c includes a touch screen 202 configured to receive user input, but in other embodiments any suitable means for receiving user input (e.g., a numeric keypad or the like) may be used without departing from the scope of this disclosure. The user interface 200 includes various information regions and/or user-selectable regions on the touch screen 202 configured to inform the user of a current air temperature in a HVAC zone 400, and to receive user feedback regarding her preferred temperature for the zone 400.

In the depicted embodiment, the application is configured to display the user interface 200 including a voting region 204, a zone region 206, a thermostat region 208, a submit icon 210, and a preferences icon 212. Using the depicted user interface 200, a user, such as an occupant of a given HVAC zone 400, may vote for a preferred set-point temperature in a corresponding zone 400. For example, the user may adjust the temperature (i.e., her vote) in the voting region 204 by touching a provided plus or minus icon (which increases or decreases, respectively, the displayed temperature in the voting region 204), and by then selecting the submit icon 210. Once submitted, the vote may be communicated via the network 100 to a client device 103 or network server 105 accessible by the building engineer, or, additionally or alternatively, to the HVAC system 109 and/or thermostat 115 directly.

The zone region 206 includes information regarding a HVAC zone 400 in which the user is located and/or for which the user is casting a vote. For example, in some embodiments an HVAC system 109 for a building 300 (FIG. 3) may be configured to separately control the air temperature within one or more zones 400 (FIG. 4). Accordingly, the HVAC system 109 may adjust the temperature within a given zone 400 based only on the received votes for users within that zone 400 and/or associated with that zone 400. The corresponding zone 400 for which the user is voting, as depicted in the zone region 206 on the user interface 200, may be user configurable (via a menu or the like accessible via the preferences icon 212), or may be set automatically according to a location of the user (using, e.g., GPS 107 location capabilities of the mobile phone 103c, a near-field communication device 604, an IPS 117 and/or receiver 402 such as, e.g., an "iBeacon" receiver developed by Apple, Inc., of Cupertino, Calif., etc., which will be discussed more fully). As seen in FIG. 2, in the depicted embodiment the user is casting her vote for a HVAC zone 400 which includes an office (office 320) located within an office suite (suite 100) of a building (1100 Broadway).

The user interface 200 also includes a thermostat region 208 which displays a current temperature for the corresponding zone 400 depicted in the zone region 206. In this regard, a user is provided with information regarding the current temperature of the zone 400 and thus she may cast her vote accordingly. For example, in the depicted embodiment, the thermostat region 208 indicates that it is currently 76 degrees Fahrenheit within the corresponding zone 400. Additionally, the smartphone or a temperature monitoring system on the individual can track temperature and report this to the network 100 and/or the HVAC system 109 and/or thermostat 115. If the user is comfortable with the current temperature, she may use the temperature indicated in the thermostat region 208 (i.e., 76 degrees) as a benchmark, and thus vote for a temperature of 76 degrees in the voting region 204. Of course, if she is hot or cold, she may vote for a temperature lower or higher, respectively, than the temperature indicated in the thermostat region 208. For example, in the depicted embodiment, the user has entered a vote of 71 degrees Fahrenheit, indicating that she wishes the temperature in the corresponding zone 400 (office 320, located in suite 100 of 1100 Broadway) to be lowered significantly from the current temperature of 76 degrees.

Once the user has inputted her desired temperature in the voting region 204, she may select the submit icon 210 in order to have her vote communicated, via network 100, to the building engineer (connected to the network 100 via, e.g., a client device 103, a network server 105, etc.) and/or the HVAC system 109 and/or thermostat 115 itself. Her vote may then be aggregated with votes received from other users of the software application, and an appropriate set-point temperature may be determined according to the aggregated votes. For example, in some embodiments the HVAC system 109 and/or thermostat 115 may be controlled (automatically via an internal controller or manually by the building engineer, etc.) to heat or cool the given HVAC zone 400 in accordance with an average (mean) temperature of the aggregated votes, a middle (median) temperature of the aggregated votes, a most-popular (mode) temperature votes of the aggregated votes, etc. In this regard, the building engineer and/or the HVAC system 109 and/or thermostat 115 will control the set-point temperature for a given zone 400 in accordance with feedback received from each of the zone's occupants rather than, e.g., merely responding to complaints of individual occupants, etc.

In other embodiments, the user may not need to manually transmit her vote (e.g., by selecting the submit icon 210 or otherwise) for it to be received and counted. For example, in some embodiments, a thermostat 115, IPS 117, receiver 402, etc., may automatically retrieve the user's preferred temperature from her smartphone 103c when the user (and thus the smartphone 103c) are within a certain proximity of the thermostat 115/IPS 117/receiver 402, as will be discussed more fully below.

In some embodiments, the votes received from each occupant may be weighted when determining a temperature for the given zone 400. For example, in some embodiments, each user's vote may be weighted according to their seniority, etc. That is, an owner of the building 300, an owner or manager of a company occupying a given HVAC zone 400, or a senior employee, etc., may have their vote weighted more heavily in determining the ultimate set-point temperature than, e.g., an entry level employee's vote.

In other embodiments, the votes received from each user may be weighted according to a location of the user. That is, in some embodiments the software application may be configured to communicate the user's vote even if she is not actually located within the zone 400 for which she is voting. For example, a first user may log on to her smartphone when traveling to work and vote for a set-point temperature she wishes the zone 400 to be heated or cooled to when she arrives, while a second user may cast her vote from within the zone 400. In such embodiments, the second user's vote may be weighted more heavily than the first user's vote in the determining the ultimate set-point temperature.

Figure 3:
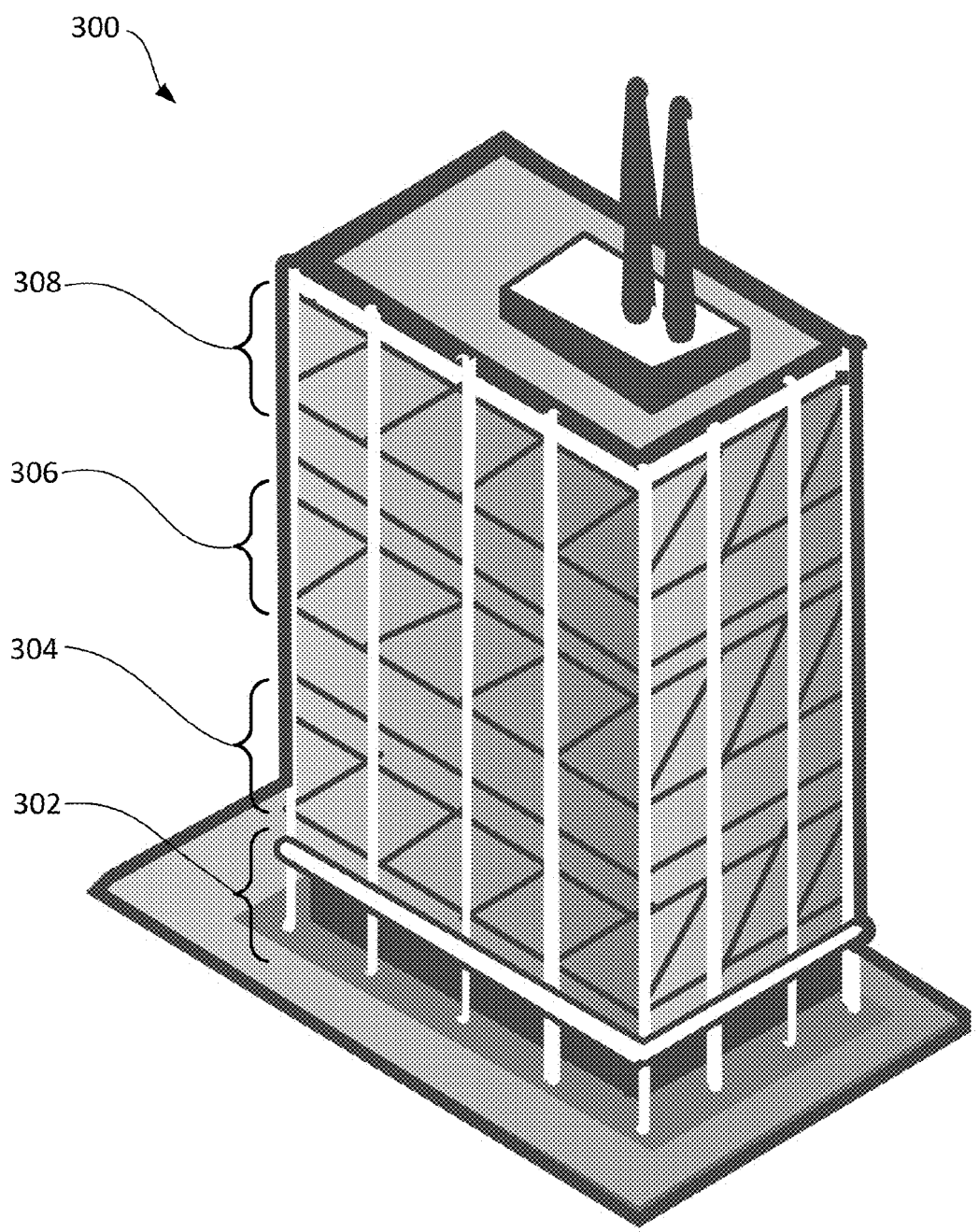
FIG. 3 is a multi-story building as one example of a building serviced by the HVAC system depicted in FIG. 1.
Figure 4:
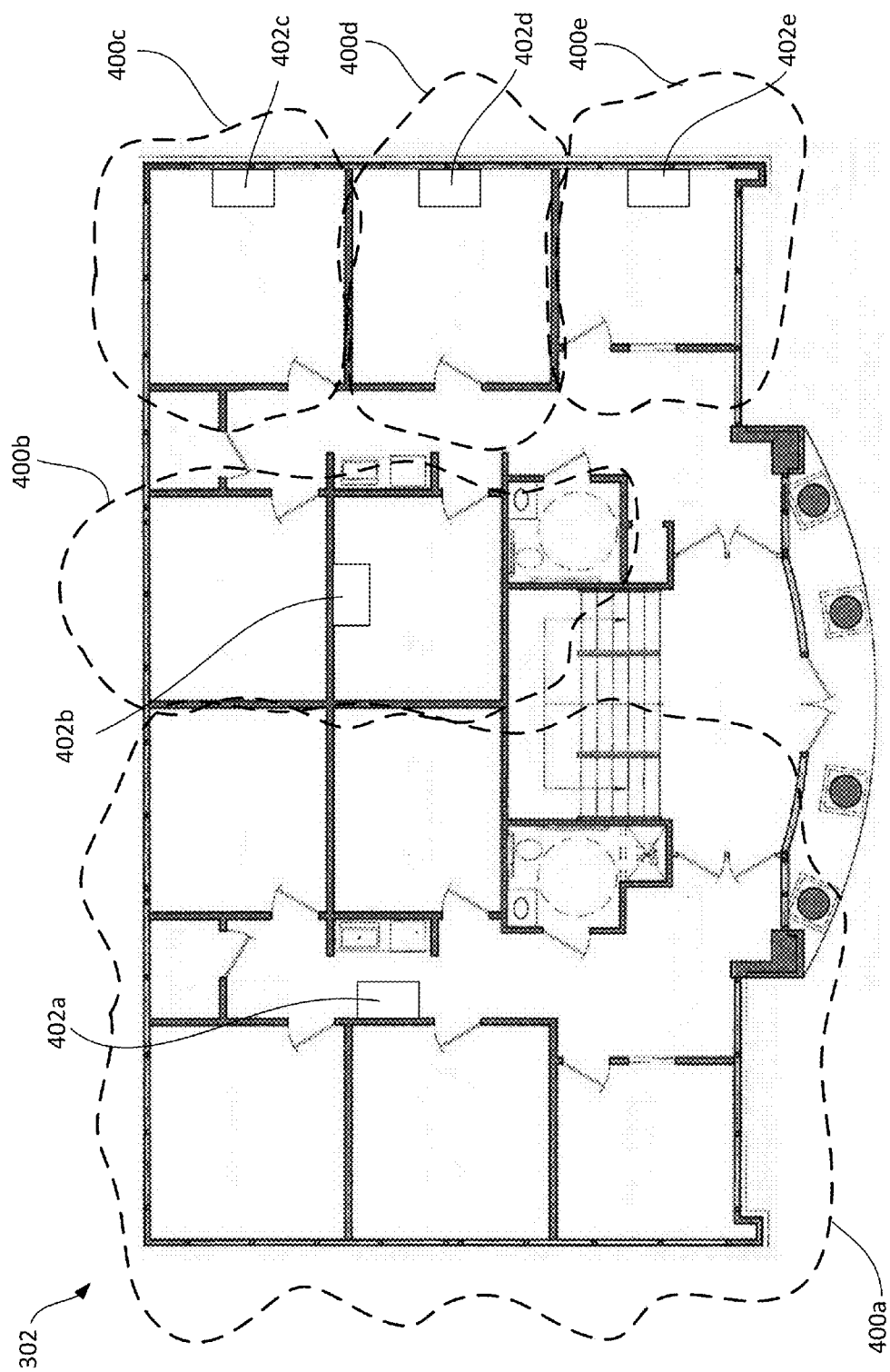
FIG. 4 is a schematic of a floor plan of the first floor of the building depicted in FIG. 3 and further including broken lines to illustrate multiple HVAC zones within the first floor.
Figure 5:
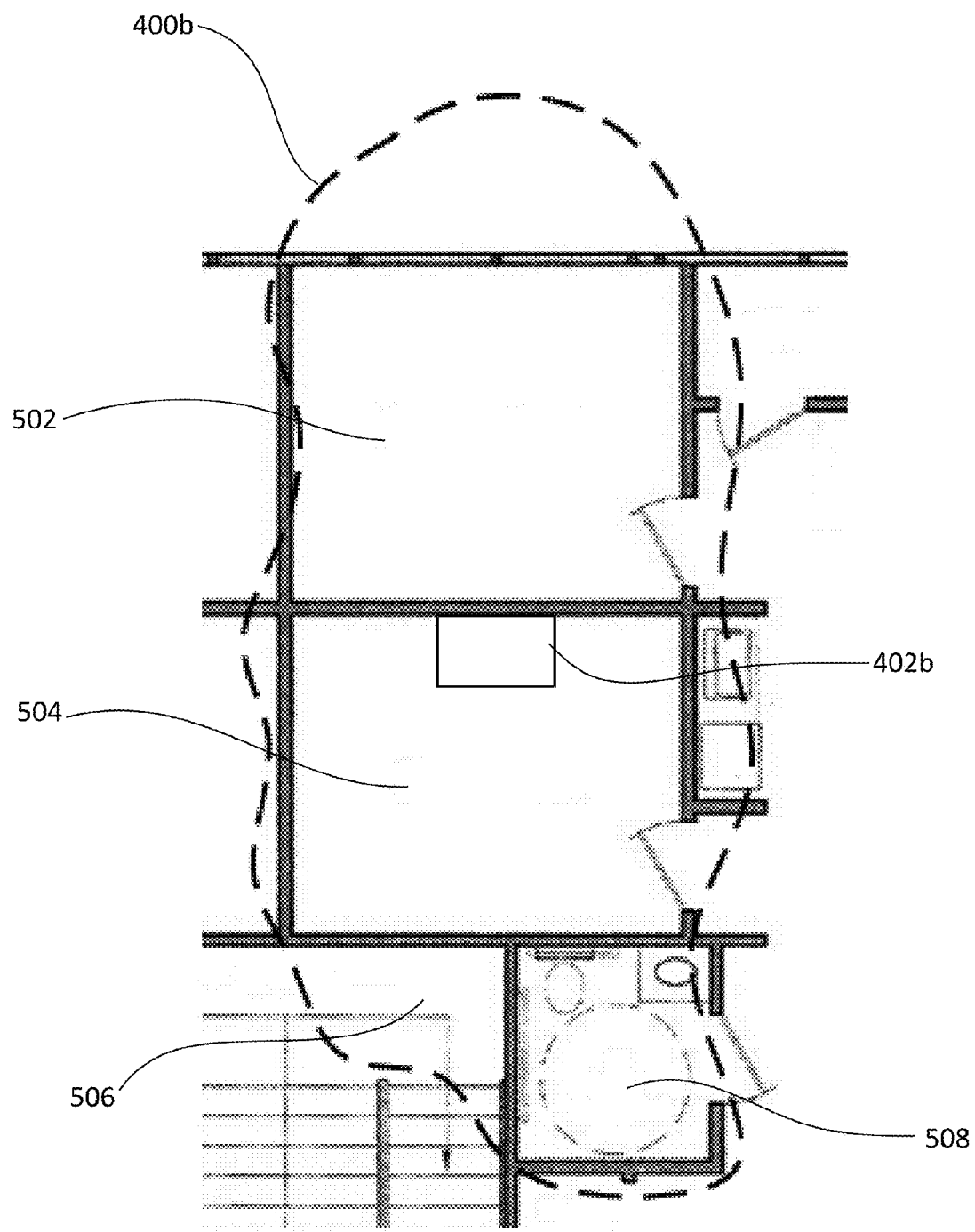
FIG. 5 is a close-up view of one of the HVAC zones depicted in FIG. 4.

This may be more readily understood with reference to FIGS. 3-5. FIG. 3 depicts a building 300 including multiple floors 302, 304, 306, 308. In some embodiments, the entire building 300 may be a single HVAC zone 400. In such embodiments, each user of the application occupying and/or associated with the building will thus have their votes aggregated to determine the set-point temperature for the building 300 as a whole.

However, in other embodiments each floor 302, 304, 306, 308 may constitute a separate zone 400. Thus, the users of the application occupying and/or associated with the first floor 302 of the building will have their votes aggregated to determine the set-point temperature for the first floor 302. Similarly, the users of the application occupying and/or associated with the second floor 304, third floor 306, and fourth floor 308 will have their votes aggregated to determine the set-point temperature for each respective floor.

In still other embodiments, the building 300 may contain multiple zones 400 not associated with a particular floor (e.g., a zone 400 may include portions of multiple floors, etc.) and/or each floor may include multiple zones 400. For example, and turning now to FIG. 4, a floor plan of the first floor 302 of the building 300 is schematically depicted with five zones 400. In some embodiments, a zone 400 may service only a single room and/or office (such as zones 400c-400e). In other embodiments, a zone 400 may service a majority or a near majority of a floor (such as zone 400a) and/or may service several rooms and/or common areas (such as zone 400b). For example, and as best seen in FIG. 5, the zone 400b services multiple rooms/offices 502, 504, 508, as well as common area 506.

In some embodiments, a location of a user (e.g., her proximity to the zone 400 for which she is casting a vote) may be determined using known GPS 107, Cell Towers 111, Wi-Fi 113, Wi-Fi enabled thermostats 115, IPS 117 location technology, and/or proximity detecting receivers 402 (such as, e.g., iBeacon receivers). For example, GPS-equipped smartphones and the like may be configured to communicate with one or more satellites 107 which can be used to determine a user's two dimensional location. For buildings having a limited number of zones 400 and/or floors, this two-dimensional location determination may be used to appropriately determine a user's relative location with respect to a given zone 400.

However, for multi-story buildings such as the building 300, a two-dimensional location determination provided by GPS 107 location technology or otherwise alone may not be sufficient to determine a user's location with respect to a specific zone 400. For example, GPS 107 location may determine a user is located within zone 400a on the first floor 302 of the building 300, but in reality a user may be located above zone 400a on one of the second through fourth floors 304-308. In these instances floor level Wi-Fi router location identification 113, 115, Indoor Positioning Systems (IPS) 117, and/or receivers 402 will be leveraged to increase location accuracy and relative floor level elevation of the users smartphone or transmission device.

For example, in some embodiments each zone 400 may include one or more receivers 402 used to locate users of the software application with the respective zone 400. For example, in FIG. 4 each zone 400a-400e is depicted with a respective receiver 402a-402e, but in other embodiments there may be more or less than one receiver 402 per corresponding zone 400. Each receiver 402 may be configured to communicate with one or more client devices 103 in order to locate users of the software application within the respective zone 400. In some embodiments the receiver 402 may be or may contain a near-field communication device configured to communicate with a user's smartphone (as one example of a mobile phone 103c) which, with or without GPS 107 functionality, may be used to determine a location of a user of the software application. Additionally, signal triangulation may be leveraged to more accurately determine the smartphone or user's location. This will be achieved by assessing the relative signal strength between at least two local Wi-Fi 113 or near-field communication (NFC) devices 604 and determining the user's position based on the speed with which signals are transmitted between the devices and the user's smartphone. The location of the Wi-Fi 113 or NFC 604 device will be fixed and known based on the building plans and schematics allowing for the calculation of the user's location as the third data point since the first two data points are known.

These receivers 402 may comprise a series of wired or wireless sensors configured to communicate with a user's mobile phone 103c and determine a distance from the mobile phone 103c to the respective receiver 402. For example, the receiver 402a may be configured to communicate with a user's mobile phone 103c and determine that the user is in fact located near the receiver 402a (and thus within the respective zone 400a) and thus count the user's vote and/or weight the user's vote accordingly (e.g., weight the user's vote higher than another user not currently located within the zone 400a). In contrast, if a user submits a vote and the respective receiver 402a determines the user is not in the corresponding zone 400a, the system may, e.g., discount the user's vote or weigh the user's vote less than a user casting her vote from the respective zone 400a.

Figure 6:
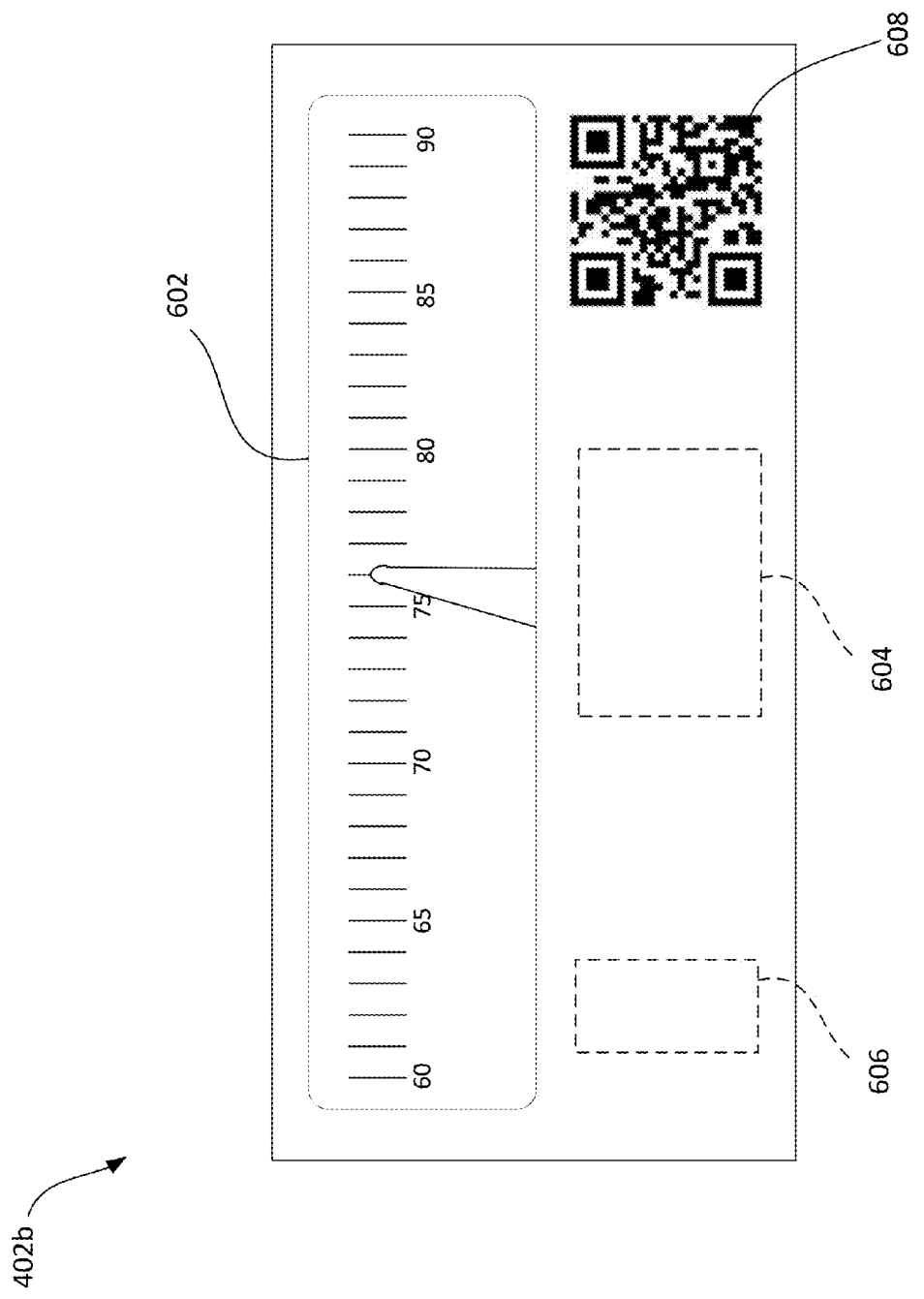
FIG. 6 is a near-field communication device which looks like a wall-mounted thermostat and is configured to be used as part of the temperature control voting system.

As one example, the receiver 402 may be an iBeacon receiver as developed by Apple, Inc., of Cupertino, Calif. The iBeacon receiver is a relatively low-powered receiver that can notify nearby devices (such as, e.g., mobile phones 103c, tablets 103e, etc.) of it presence such that the nearby device is able to perform desired actions when in close proximity to the iBeacon receiver. More particularly, in some embodiments the iBeacon receiver may transmit a unique identifier to a nearby device (mobile phones 103c, tablets 103e, etc.), which then can identify the location of the receiver by, e.g., referencing a look-up table or the like using the unique identifier. In some embodiments, the nearby device may also connect to the iBeacon receiver in order to send and/or receive information. Returning to the above example, in some embodiments the iBeacon receiver may thus act as a receiver 402 of an IPS 117 which determines (or, additionally or alternatively, enables the nearby device to determine) the relative location to the nearby device with respect to the iBeacon receiver. Furthermore, iBeacon receiver may receive information from the nearby device (such as, e.g., a temperature vote of the user associated with the device) and then ultimately transmit that vote via, e.g., network 100 to the HVAC system 109, the building engineer, etc., as discussed. Accordingly, in some embodiments, a user may not need to transmit her vote/temperature preference using, e.g., the submit icon 210 or otherwise, but rather her vote may be automatically cast when the user is within a certain proximity of a temperature controllable zone, etc. For example, in some embodiments the receiver 402 (e.g., iBeacon receiver) may transmit a signal to a user's smartphone 103c or the like when the user is within a certain proximity to the receiver 402. The signal may cause a temperature control software application on the user's smartphone 103c to "wake up" (if the software application is in a standby or OFF mode) and subsequently automatically transmit the user's temperature preference to the receiver 402. The receiver 402 may in turn ultimately transmit that vote via, e.g., network 100 to the HVAC system 109, the building engineer, etc., as discussed, and thus the user's vote will be cast without requiring the user to manually submit her temperature preference each time she enters a zone, etc. In this regard, a user may simply configure the software application to include her temperature preferences which will in turn will be automatically retrieved by nearby receivers 402 (e.g., iBeacon receivers or otherwise) when the user is within a certain proximity of the receiver 402.In some embodiments, the receivers 402 (e.g., an iBeacon receiver or otherwise) may be integrally included in a wall-mounted thermostat (e.g., a Wi-Fi enabled thermostat 115 or otherwise) or a may be designed to appear like a wall-mounted thermostat. For example, FIG. 6 depicts one embodiment of a receiver 402b designed to appear as a wall-mounted thermostat. The receiver 402b may include a thermostat portion 602 (which may in some embodiments display a current temperature of the respective zone 400b), the near-field communication device 604 (used to locate users within the respective zone, as discussed), an infrared (IR) sensor 606 (used to detect movement, and thus persons, within the respective zone 400b), and/or a barcode 608 (i.e., a QR code). This barcode or QR code 608 can be used to identify the specific location of the user as well since a record may be kept with the location of each of these devices within the specific floor and building level. In some embodiments, even though the receiver 402b may look like a traditional wall-mounted thermostat, it may not have the same functionality as a traditional wall-mounted thermostat. For example, for aesthetic or other reasons the receiver 402b may appear to be a wall-mounted thermostat but lack some functionality of a traditional thermostat (e.g., a set-point temperature of the HVAC system 109, etc., may not be controllable at the wall-mounted thermostat). In other embodiments, the receiver 402b may be a Wi-Fi enabled thermostat 115 which may wirelessly communicate with, e.g., the network 100, a user's smartphone 103c or computer 103a, 103d, etc., in order to receive user input and adjust the HVAC system 109 accordingly, as is known in the art.

The receiver 402b may be configured to determine, via the near-field communication device 604, a user's relative position to the zone 400b for which she is casting her vote. For example, if the near-field communication device 604 cannot communicate with the user's mobile phone 103c, the receiver 402b may determine that the user casting the vote is not near the receiver 402b (and thus not in the corresponding zone 400b) and may discount her vote accordingly (e.g., not count the vote or weigh the vote less than other users' votes who are in the zone 400b). In contrast, if the near-field communication device 604 can communicate with the user's mobile phone 103c, the receiver 402b may determine that the user casting the vote is near the receiver 402b (and thus within the zone 400b) and then count and/or weigh her vote heavier than votes cast outside of the zone 400b.

In embodiments where the receiver 402b includes the QR code 608 or the like, the QR code 608 may be accessible by an end user in order to assist with downloading and/or installing the software application of the temperature control voting system. For example, using, e.g., a camera provided on the mobile phone 103c, a user may scan the QR code 608 and the mobile phone 103c may be configured to extract information from the QR code, such as a link to a website where the temperature control voting system software application may be downloaded. The mobile phone 103c may then download and install the application to the mobile phone 103c. In some embodiments, the QR code 608 may contain further information such as information regarding which HVAC zone 400 the receiver 402 containing the QR code 608 is located. In such embodiments, when the user ultimately accesses the downloaded and installed application, the zone region 206 of the user interface 200 may be automatically populated.

In other suitable embodiments, the receiver 402b need not contain the QR code 608. For example, in addition to or instead of the accessing the software application via a link provided in the QR code 608, a user may simply download the application from a known online marketplace (e.g., an application store or the like). In other embodiments, a company or other organization occupying a given zone 400 may circulate an email, flier, etc., containing a link to the software application (in a QR code or otherwise) for the end users to access and ultimately download the application.

In some embodiments, a user's vote may be weighted/counted differently at different times throughout a day. For example, the temperature control voting system may be configured to weight/count votes differently during a normal occupancy time of the building 300 (e.g., 8:00 AM to 5:00 PM) than during afterhours (e.g., 5:00 PM to 8:00 AM). In this regard, the system may weigh less heavily, or even disregard, user's preferences during the afterhours period than during the normal occupancy time. Furthermore, the system may count and/or weight different users' temperature preferences differently in each of these periods. For example, a higher seniority user (e.g., manager-level employee) of an organization may have her vote counted regardless of her proximity during the normal occupancy time of the building, while a lower seniority user (e.g., staff member) may only have her vote counted if within a certain proximity of a receiver 402, and even then may have her vote weighted less heavily than the manager's vote if weighted according to seniority, etc. (as discussed).

This may be more readily understood with reference to a specific example. Specifically, the system may be configured with the normal occupancy time and afterhours schedule as discussed above; i.e., 8:00 AM to 5:00 PM, and 5:00 PM to 8:00 AM respectively. In this regard, the system (via, e.g., iBeacon receivers 402 or the like) may begin to recognize users as they enter the building 300, a zone 400, etc., during the normal occupancy time, and retrieve the users' temperature preferences or votes from respective smartphone applications operating on the users' mobile devices 103c. The system may periodically (or, alternatively, continuously) aggregate these received votes to determine an appropriate set-point temperature (applying, if applicable, any of the numerous weighting factors, as discussed).

The system may be further configured such that if certain users leave the building 300/zone 400, etc., during the normal occupancy time, then their vote/temperature preference will no longer be counted when determining the ultimate set-point temperature. So, for example, if a staff member leaves for an off-site meeting, coffee break, lunch, etc., the receiver 402 may determine that the user is no longer within the required proximity, and thus no longer count her vote when determining the set-point temperature. However, for other users who have higher seniority (e.g., manager level employee), the system may continually count their votes regardless of proximity. In that regard, if a manager left for an off-site meeting, coffee break, lunch, etc., the receiver 402 may determine that the user (manager) is no longer within the required proximity, yet nonetheless continue to count her vote when determining the set-point temperature notwithstanding her absence. Accordingly, upon her return, she may be greeted with a desirable temperature.

In that regard, the system may also be configured to only count certain users' votes at certain points of the day and/or to completely disregard votes at certain points of the day. That is, returning to the above example, in one embodiment the system may disregard all user preferences during the afterhours period and thus operate according to a predetermined afterhours schedule. Or the system may only count certain votes (e.g., manager-level employees) during the afterhours period. For example, during the afterhours period the system may disregard all lower-level staff members' votes (regardless of proximity), may further disregard all manager-level votes who are not within the building (i.e., not within a certain proximity of a receiver 402), and thus may only count votes that are cast by manager-level employees who are also within a certain proximity of the receiver 402. Accordingly, in the above example, if the manager were to leave for the night (rather than to merely take a coffee break or lunch during the normal occupancy time), the system may be able to appropriately recognize that the user is likely not returning until the next morning, and thus discontinue to count her votes when determining the set-point temperature overnight.

Figure 7:
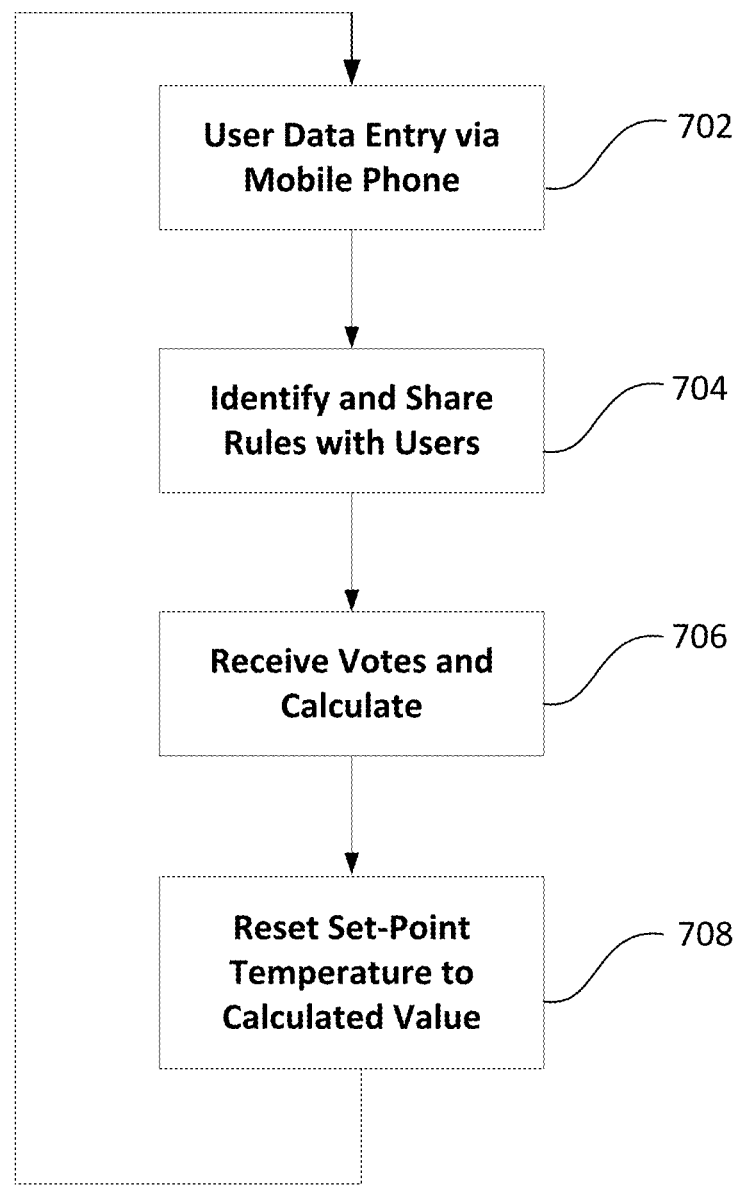
FIG. 7 is flowchart generally depicting a method for registering one or more users for a temperature control voting system and for controlling the HVAC system according to votes received from the one or more users.

FIG. 7 is a flowchart generally depicting a method for registering one or more users for a temperature control voting system according to aspects of the disclosure and for controlling the HVAC system 109 and/or the thermostat 115 accordingly. At step 702, a user enters data via an installed software application on her mobile phone 103c (e.g., smartphone). This information may be entered in response to an initial setup of the application (e.g., the user may be prompted when installing the application) or may be entered via a menu accessible by selecting the preferences icon 212. For example, the user may enter her name (first and last), location information (to identify her corresponding zone 400 such as, e.g., building name or address, floor number, office suite, etc.), and/or thermostat information (e.g., the user may be prompted to associate with a receiver 402 via a QR code, serial number provided on the receiver 402, etc.).

In some embodiments, the user may be prompted to answer a series of questions at step 702. The answers of the questions may be used to, e.g., provide a recommendation of a set-point temperature, provide automatic voting on behalf of the user, etc. For example, the user may be asked to answer: Do you have a window in your office? What time do you want your office at temperature? What temperature do you want in your office? May we use the GPS capabilities on your phone to locate you? In still other embodiments, the user may be asked to verify her current location. For example, the user may be located using GPS 107 location services and/or near-field communication functionality of her smartphone 103c, and may be prompted to confirm her location. In some embodiments the user may be asked to confirm the name or address of her building 300, or the name or location (e.g., office number, etc.) of her corresponding HVAC zone 400. In other embodiments, the user may be presented with a photograph of her building 300 (e.g., a street view photograph of her building) and then may be prompted to confirm that the photograph is of her current location.

Once the user is registered at step 702, she may be associated with a particular zone 400 at step 704 and be presented with rules for casting a vote. For example, the user and/or the user's mobile phone 103c may be presented with an occupancy schedule indicating what times of the day and/or the week the HVAC system 109 is actually controlled (and thus what times of the day and/or the week the user is allowed to cast a vote). The user and/or the user's mobile phone 103c may also be notified how close to the zone 400 she needs to be in order to cast a vote (e.g., the user may need to be within the zone 400, or within a certain proximity of the zone 400, or there may be no proximity restrictions; i.e., the user may cast a vote from anywhere). The user and/or the user's mobile phone 103c may be notified of a temperature range (e.g., minimum and maximum temperature) in which the user is permitted to cast a vote. For example, in some embodiments the user may not be permitted to cast a vote lower than, e.g., 66 degrees Fahrenheit, and may not be permitted to cast a vote higher than, e.g., 78 degrees Fahrenheit. Still further, the user and/or the user's mobile phone 103c may be provided with information regarding the temperature increments in which she may cast a vote (e.g., a half degree Fahrenheit, a full degree Fahrenheit, etc.). The user and/or the user's mobile phone 103c may be provided with rules regarding the frequency of votes cast (e.g., the user may only be permitted to cast 1 vote per hour, etc.). And finally, the user and/or the user's mobile phone 103c may be provided with rules regarding weighting of the votes, and more particularly, how heavily her vote will be weighted in comparison to others due to her status, position in the company, location, etc., as discussed.

Once the user and/or the user's mobile phone 103c is registered, identified, and synced with the HVAC system 109 and/or thermostat 115 (due to sharing of the appropriate rules, protocols, etc.), votes are received from multiple users at step 706, and an appropriate set-point temperature is calculated as will be discussed in more detail with reference to FIG. 8. Finally, at step 708, the set-point temperature of the HVAC system 109 and/or thermostat 115 will be adjusted to the calculated temperature, a thus the HVAC system 109 and/or thermostat 115 will heat or cool a corresponding zone 400 according to the cumulative preferences of the occupants of the zone 400.

Figure 8:
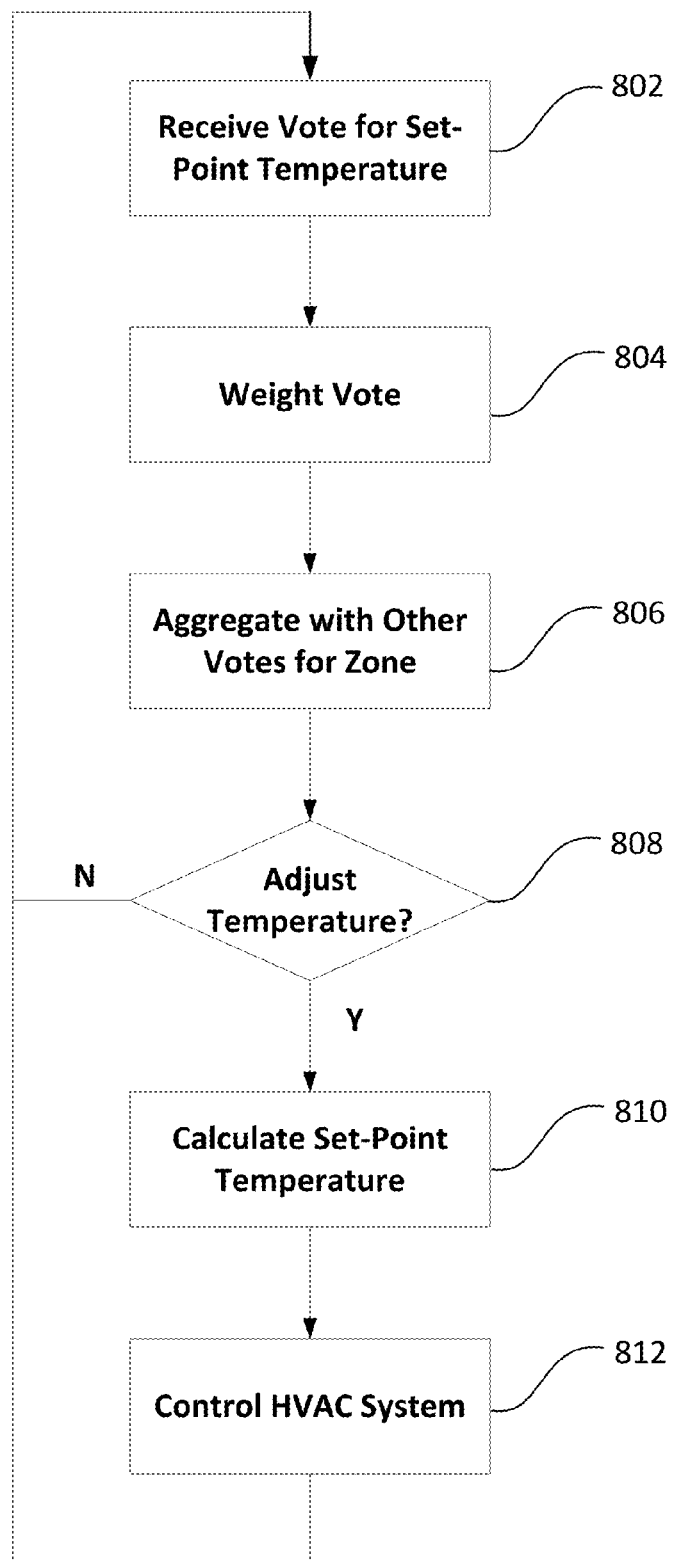
FIG. 8 is a more detailed flowchart of a method for controlling the HVAC system according to the received votes of the one or more users.

FIG. 8 depicts in more detail a process for adjusting the set-point temperature for a given HVAC zone 400 in response to the aggregated votes of the users employing the discussed temperature control voting application. More particularly, FIG. 8 depicts a flowchart of a method for controlling the HVAC system 109 and/or thermostat 115 according to the preferences of the occupants of a given HVAC zone 400 within a building (i.e., according to the aggregated votes of the occupants within the building 300 and/or a given zone 400 within the building 300).

At step 802, a network server 105, thermostat 115, and/or the HVAC system 109 (hereinafter individually or collectively referred to simply as "the system") receives, via the network 100, a vote from a first user employing, e.g., the smartphone application discussed in connection with FIG. 2. At step 804, the system may weigh the user's vote according to one or more rules. For example, a manager's vote may be given a higher weight than, e.g., an entry level employee's vote. Further, the received vote may be weighted according to the user's proximity to the corresponding HVAC zone 400 (as determined using the GPS 107 location abilities of the user's smartphone, a near-field communication device 604 provided in a receiver 402, etc.).

In some embodiments, the duration of a user within the HVAC zone 400 may be used to weight her received vote. For example, using either the near-field communication device 604 provided in the receiver 402 and/or the GPS 107 location ability of the user's smartphone, etc., the system may determine how much average time the user spends within a given zone 400. The system may then weigh more heavily the votes of users who spend more time within the zone 400. For example, users who are in the zone 400 for most of the day may have their vote weighted more heavily than users who come and go throughout the day.

The frequency of a user's votes may also be considered when weighing the received vote at step 804. For example, the system may be configured to periodically update the set-point temperature in response to received votes. In this regard, there will be an elapsed period of time between when the system updates the set-point temperature (e.g., the system 109 and/or thermostat 115 may update the set-point temperature every 30 minutes). During that elapsed time, a user may be allowed to submit more than one vote, and, in some embodiments, may be allowed to submit as many votes as she pleases. Accordingly, the vote received at step 802 may be weighted more heavily for users who submit more votes during the elapsed time than other users.

At step 806, the system aggregates the weighted votes with votes received from other users. At step 808, the system determines if it is an appropriate time to adjust the set-point temperature. For example, and as discussed, the system may be configured to adjust the set-point temperature periodically (i.e., every 30 minutes), and in such embodiments the system will determine at step 808 whether or not the appropriate period of time has passed. In other embodiments, the system may be configured to adjust the set-point temperature in response to a certain threshold of votes being received. For example, the system may adjust the set-point temperature every time, e.g., 100 votes are received, and thus in such embodiments the system at step 808 determines whether or not the threshold of votes has been received.

If at step 808 the system determines that it is not an appropriate time to adjust the set-point temperature (e.g., the appropriate period of time has not yet elapsed and/or the minimum number of votes have not yet been received, etc.), the method returns to step 802 and then through steps 804-808 to continually collect and aggregate votes until the appropriate time to adjust the temperature.

However, if at step 808 the system determines it is an appropriate time to adjust the set-point temperature, the method proceeds to step 810 where a new set-point temperature is calculated. As discussed, in some embodiments the new set-point temperature may be calculated by determining, e.g., the mean, median, or mode of the aggregated votes. Once the set-point temperature is known, the method proceeds to step 812 where the HVAC system 109 is controlled accordingly. More particularly, the HVAC system 109 is controlled to supply warm or cool air to the corresponding zone 400 in order to heat or cool, respectively, the air in the zone 400 to the calculated set-point temperature. Finally, the method returns to step 802, where the system will continually collect votes from users (via the method looping through steps 802-808) until the next appropriate time to adjust the set-point temperature.

Although in some embodiments the method described in connection with FIG. 8 may be performed autonomously (e.g., by an artificial intelligence algorithm provided at a network server 105 operatively connected to the HVAC system 109 and/or thermostat 115 via the network 100, or by an internal controller provided at the HVAC system 109 and/or thermostat 115 itself, etc.), in other embodiments the building engineer or the like may perform one or more of the above-described steps. For example, in some embodiments the building engineer may be provided with a notification (via, e.g., one or more client devices 103) indicating the calculated set-point temperature, and the engineer may thus manually adjust the HVAC system 109 and/or thermostat 115 to heat or cool the corresponding zone 400 accordingly. Further, in still other embodiments, the building engineer or other may be able to override the control of the HVAC system 109 and/or thermostat 115 in step 812 in response to, e.g., an instruction from the building owner, etc. Further, in some embodiments the system may be configured to provide the building engineer with an error code if, e.g., the system does not receive any votes from users and/or a set-point temperature is not calculated (due to, e.g., network 100 failure or the like). Accordingly, in the event of an error code, the building engineer may manually adjust the set-point temperature (to, e.g., a default temperature or the like) in response to being notified of the error.

In some embodiments, the votes received by the system may be used for other purposes in addition to determining an appropriate set-point temperature. For example, in some embodiments the system may determine how much fresh air to draw in from an outside of the building 300 according to the amount of users casting a vote and/or an amount of users detected to be within a given zone 400. As will be appreciated by those having skill in the art, an amount of fresh air needed properly ventilate the building 300 may be largely dependent on an amount of occupants within the building. For traditional HVAC systems, the amount of occupants within the building 300 at any given time may be approximated according to, e.g., an anticipated occupancy rate during business hours, etc.

Figure 9:
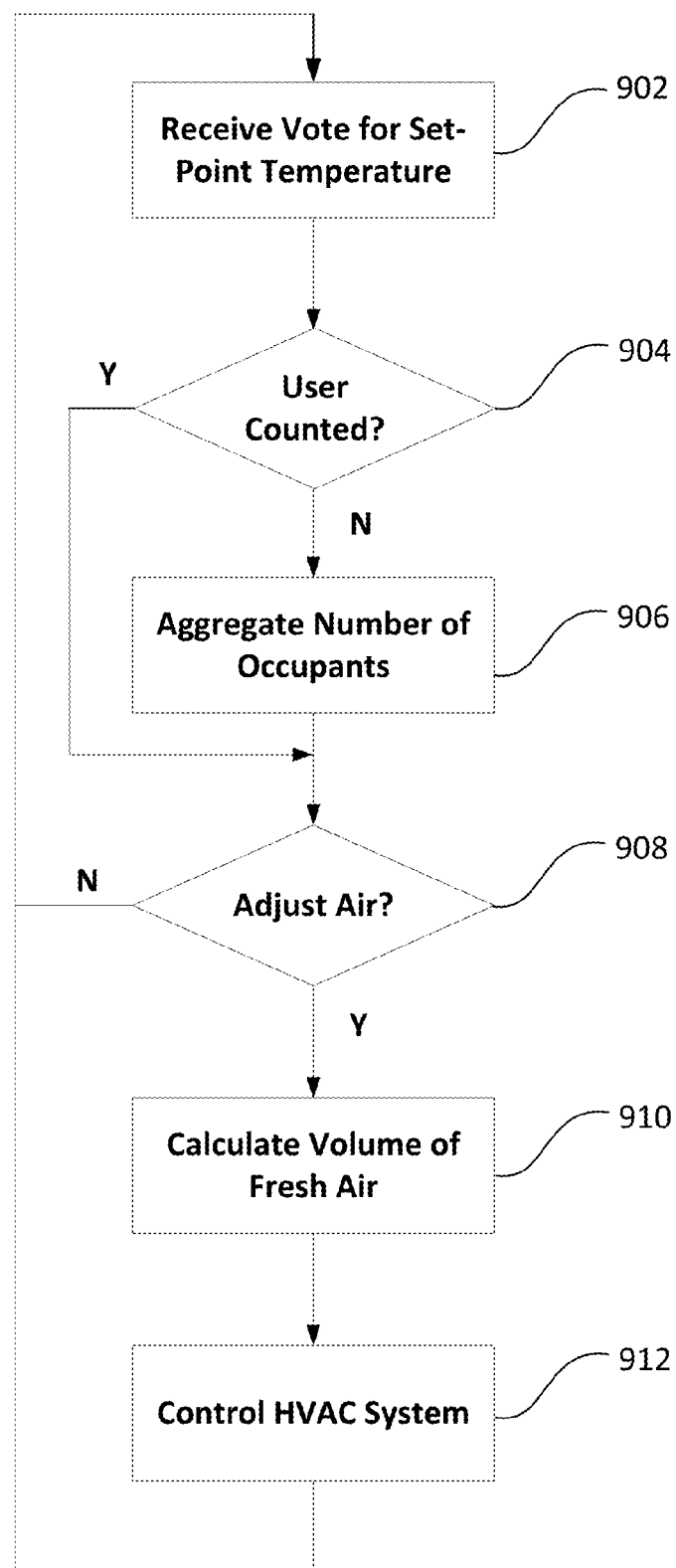
FIG. 9 is a flowchart of a method for controlling how much fresh air in drawn in by the HVAC system in response to the votes received via the temperature control voting system.

However, in some embodiments of the instant disclosure, the received votes are used to determine an appropriate amount of air drawn in from the outside of the building 300. For example, FIG. 9 depicts a flowchart of a method for controlling how much fresh air is drawn into the building 300 by the HVAC system 109 in response to determining how many occupants are within the building 300 and/or are within a given zone 400 within the building 300. At step 902 the system receives a vote for a set-point temperature from a user employing the software application as discussed in detail above. At step 904, the system determines whether or not the user from which the vote was received has already been counted. That is, because (as discussed) in some embodiments each user may be able to cast more than one vote per voting period, the system may determine at step 902 (by referencing a user id, IP address, phone number associated with a smartphone running the application, etc.) whether or not the user has already cast a vote. If the user has not yet cast a vote, the method proceeds to step 906 where the user is added to a running count of other users in order to form an aggregate number of occupants (i.e., an estimate as to how many people may be in the building 300 and/or a given zone 400 within the building 300). If the user has already been counted, the method skips step 906 in order to avoid double counting the user.

At step 908, the system determines if it is an appropriate time to adjust the amount of fresh air being drawn into the building. For example, the system may be configured to calculate how much fresh air to draw into the building periodically (i.e., every 30 minutes), and in such embodiments the system will determine at step 908 whether or not the appropriate period of time has passed. In other embodiments, the system may be configured to calculate how much fresh air to draw into the building every time the set-point temperature is adjusted at step 812 of the method depicted in FIG. 8, and accordingly the system will determine at step 908 whether or not the set-point temperature has recently been adjusted and/or is concurrently being adjusted.

If at step 908 the system determines that it is not an appropriate time to adjust the amount of fresh air being drawn into the building (e.g., the appropriate period of time has not yet elapsed and/or the set-point temperature has not recently been updated, etc.), the method returns to step 902 and then through steps 904-908 to continually collect votes and thus accurately count the number of users within the building.

However, if at step 908 the system determines it is an appropriate time to adjust the amount of fresh air entering the building, the method proceeds to step 910 where an appropriate amount of fresh air to be drawn in from the outside is determined (via, e.g., a lookup table, equation, etc.). The method then proceeds to step 912 where the HVAC system 109 is controlled to draw in more or less air according to the current occupancy of the building. Finally, the method returns to step 902, where the system 109 will continually collect votes from users (via the method looping through steps 902-908) until the next appropriate time to adjust the amount of fresh air entering the system. Because more energy may be required to heat or cool the outside air drawn into the building than is needed to heat or cool recirculated air, by more accurately determining the number of current occupants (via the received votes) the HVAC system 109 may thus be more energy efficient than its traditional counterpart (which may merely estimate an occupancy according to, e.g., time of day, etc.).

In addition to controlling the HVAC system 109 in response to the received votes (e.g., adjusting a set-point temperature and/or an amount of fresh air to draw into the building 300, as discussed), in some embodiments the received votes from users of the software application may be used for other purposes. For example, in some embodiments the received votes may be used as an economic indicator. That is, knowing how many users are voting (or not voting) within a particular zone provides an indication of how a company/industry located within that zone is performing.

For example, returning to FIG. 4, it may be known that the first floor 302 of the building 300 is occupied by a given company (e.g., a financial services company). By comparing how many collective votes are received from users in each of the zones 400a-400e on the first floor 302 over time, it can be determined whether or not the particular company is increasing or decreasing in size. So, if the aggregated votes from zones 400a-400e increase over time, this may be indicative that more users are on the first floor 302 thus indicating that the particular company (and to some extent the financial services industry as a whole) is growing. In contrast, if the aggregated votes from zones 400a-400e reduce over time, this may be an indication that the company/industry is shrinking in size. This information may be valuable to, e.g., investors, fund managers, etc., who may be interested to know the general trends within various industries before investing. Accordingly, data regarding a number of votes as compared to a type of company/industry may be compiled by, e.g., a network server 105 or the like, and then sold to interested parties. In some embodiments, the data from multiple buildings and even multiple cities, etc., may be compiled to provide a country-wide overview of the corresponding industry.

In other embodiments, information provided by, e.g., a building engineer or the like when they are configuring the HVAC system 109 for use with the above-described temperature control system may be useful beyond the purpose of controlling of the HVAC system 109. For example, when initially registering an HVAC system 109 to be used in conjunction with the temperature control voting system, a building engineer or the like may be asked to input information regarding the building 300 and/or the system 109 including, e.g., a GPS location of the equipment, a brand and/or model of the equipment, serial numbers of the equipment, age of the equipment, etc. That is, the building engineer may be prompted with a series of question and/or menus when initializing the temperature control voting system. For example, the building engineer may be prompted to enter a building address, may be prompted to enter models of equipment making up the HVAC system 109 (by, e.g., directly inputting the equipment specifications or by selecting the equipment from a dropdown menu, etc.), and/or may be prompted to input floor plans, mechanical plans, space plans, etc. This information may then be compiled an in some instances sold to interested parties (e.g., manufacturers of HVAC equipment or others, who sell, service, replace, etc., HVAC equipment). For example, if a building engineer registers an HVAC system 109 and inputs that the system is twenty years old, this information can be sold to an HVAC manufacturer (along with details regarding the space to be serviced, etc.) who may then contact the building engineer to offer new equipment to replace the aging system.

Although the above-described embodiments have been discussed in connection with a single building 300, in some embodiments the application may be configured to communicate across several zones and/or buildings. For example, using either GPS or near-field communication abilities as discussed, the application may be configured to detect a current building and/or zone in which the user is located and provide a vote accordingly. So if the user visits a second building for a meeting, etc., the application may detect a corresponding zone 400 in which the user is now located and allow the user to vote for the temperature within the new zone.

Further, in some embodiments the application may be configured to allow the user to setup automatic voting. For example, the application may be user configurable (via a menu accessible by selecting the preferences icon 212 in the user interface 200, etc.) such that a user may enter a temperature or temperatures (dependent on a time of day, etc.) she wishes to vote for, and such that the application will automatically submit this vote for a corresponding zone. So if a user is usually cold (and thus typically votes for a temperature higher than a normal set-point temperature), she may configure the application to automatically vote for a temperature of, e.g., 78 degrees Fahrenheit. Further, for embodiments where the application is configured to operate across multiple zones or buildings, as discussed, the application may thus automatically detect a current zone 400 in which the user is located and automatically submit a vote accordingly. For example, and returning to the above example, the user's application may automatically submit a vote of 78 degrees Fahrenheit whenever it determines that the user is located within a corresponding zone 400.

Although the above examples have been described in connection with an office building, it should be appreciated that embodiments of the disclosure may be employed in different types of zones or buildings without departing from the scope of this disclosure. For example, retail establishments may employ embodiments of the disclosure and accordingly allow patrons to vote on the temperature. In one example a movie theater may be configured to receive votes of moviegoers (manually or automatically), while in another example a restaurant may be configured to receive votes of diners. Additionally, the system can be leveraged in residential applications to allow users to vote on the temperature within a single household.

And although the above examples have been described in connection with a mobile phone 103c (e.g., a smartphone application), in other embodiments a vote may be submitted using other devices such as a PC 103a, a PDA 103b, a laptop computer 103d, a tablet 103e, an embedded biomedical chip 1002, an external biomedical device 1004, a brainwave temperature control assessment (allowing users to have their requested temperature change captured via electronic brainwave signal monitoring and avoiding the need for manual input of data), etc. For example, in some embodiments a software application may be provided on users' workstations (e.g., a user's PC 103a or laptop computer 103d) located within a given zone 400. In such embodiments, when a user logs in to their respective workstation in the morning, etc., they can submit their vote via the workstation. In some embodiments, the user may be prompted to enter their location (zone 400) when logging on to their workstation by, e.g., providing a room number, etc., and then submitting their vote accordingly. In other embodiments, the user may be provided with a floor plan or the like of the building 300 (such as, e.g., the floor plan depicted in FIG. 4), and the user can thus select an appropriate location and vote accordingly. In still other embodiments, the user's workstation may be configured during setup to be associated with a given zone 400 (e.g., a zone in which her office is located) and thus the user need not enter her zone but rather just submit her temperature vote for the day.

Figure 10:
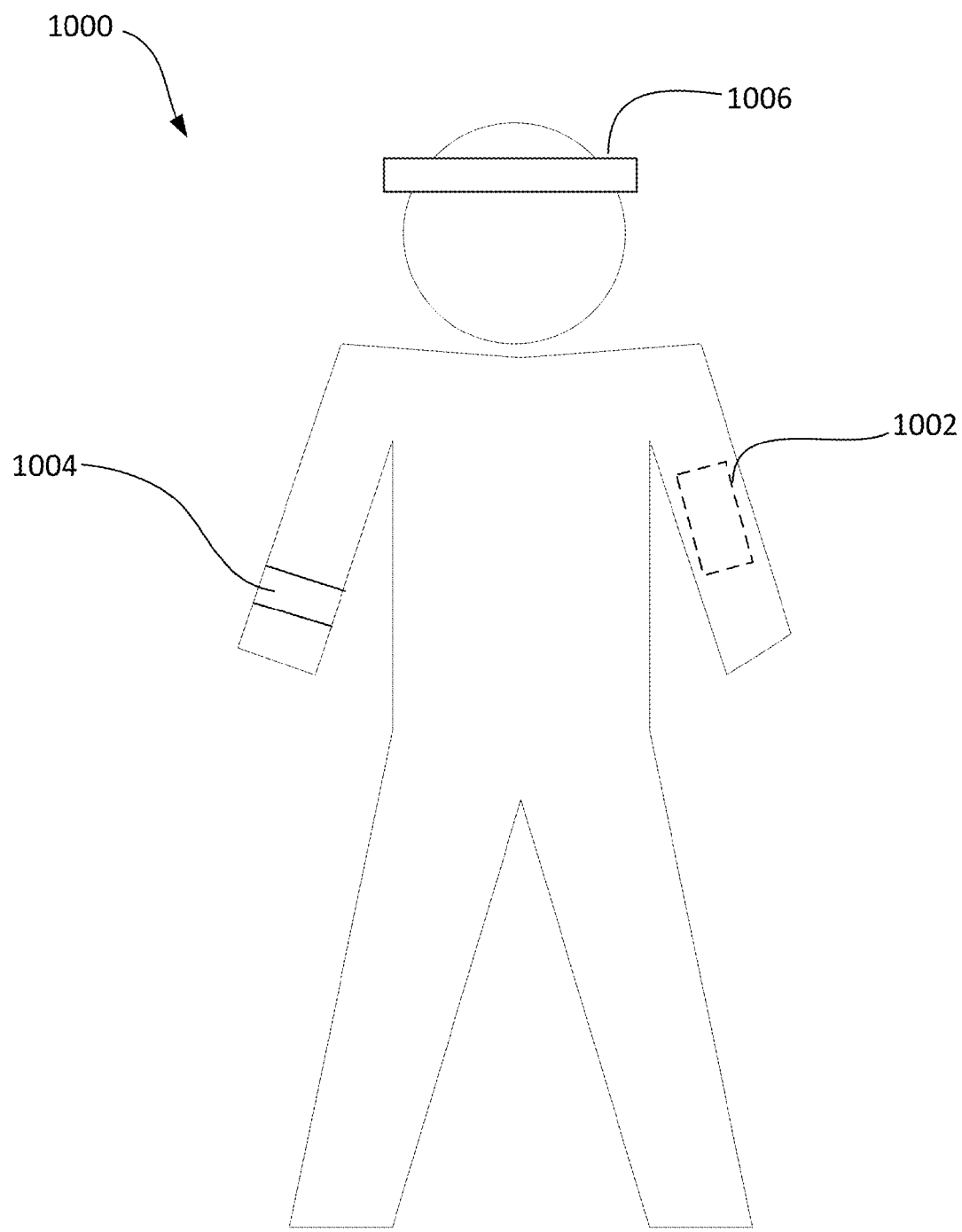
FIG. 10 is a schematic of an occupant including biomedical devices and brainwave electronic signal tracking devices used to cast a vote on behalf of the occupant.

In still other embodiments, a biomedical device and/or a brainwave electronic signal tracking device may be used to cast a vote on behalf of a user. This may be best understood with reference to FIG. 10. FIG. 10 is a schematic of an occupant 1000 of the building 300 including an embedded biomedical chip 1002, an external biomedical device 1004, and a brainwave electronic signal tracking device 1006. The embedded biomedical chip 1002 may be an implantable chip that is positioned, e.g., under the skin of the occupant 1000 and which is configured to communicate information about the occupant 1000 to, e.g., the network 100, the near-field communication device 604, etc. For example, the embedded biomedical chip 1002 may contain information regarding the occupant's past medical history, current metabolic status, etc. In some embodiments, the embedded medical chip 1002 may be configured to detect one or more of skin temperature, blood flow, etc., of the occupant 100 which can then be provided to the temperature control voting system and thus an appropriate "vote" for a set-point temperature can be cast on behalf of the occupant 1000. By way of example, in some embodiments the biomedical chip 1002 may detect, e.g., that the occupant's 1000 skin is cold, or that the occupant 1000 has goose bumps. In such embodiments, the biomedical chip 1002 may send a vote to the system to raise the set-point temperature. In this regard, the biomedical chip 1002 automatically votes for the user without requiring, e.g., a software application or the like installed on a smartphone. In other embodiments, the biomedical chip 1002 may be interfaced with a client device 103 (e.g., a smartphone) and thus communicate the occupant's 1000 vote to the client device 103, which in turn communicates the vote via the network 100 as discussed.

Additionally or alternatively, an external biomedical device 1004 may be used to automatically vote for the occupant. Similar to the embedded biomedical chip 1002, the external biomedical device 1004 may communicate information regarding the occupant's past medical history, current metabolic status, etc., and thus vote for a higher or lower set-point temperature accordingly. In some embodiments the external biomedical device 1004 may be a smart watch or the like configured to determine a user's heart rate, skin temperature, etc., via contact of the smart watch with the user's wrist. The smart watch itself may include a software application configured to communicate via network 100 with the HVAC system 109 and/or thermostat 115 and thus communicate the occupant's 1000 vote accordingly (automatically by sensing the occupant's 1000 skin temperature, etc., or manually via user input through a user interface provided on the smart watch). In other embodiments, the smart watch may be interfaced with a client device 103 (e.g., the smart watch may be interfaced with the occupant's mobile phone 103*c*) and the occupant's 1000 vote can be communicated to the HVAC system 109 and/or thermostat 115 via a software application provided on the client device 103. Additionally, the smartphone itself may monitor the temperature in the area the user is in and subsequently may prompt the user to adjust the temperature vote or to vote for a temperature change automatically.

Additionally or alternatively, a brainwave electronic signal tracking device 1006 may be used to automatically vote for the occupant. The brainwave electronic signal tracking device 1006 may monitor the brainwave signals of an occupant and determine, e.g., the occupant's preference accordingly. For example, if the brainwave electronic signal tracking device 1006 interprets the brainwaves of the occupant 1000 as indicating that the occupant 1000 is cold, the device 1006 (directly or via, e.g., the smartphone application) may submit a vote on behalf of the user to increase the temperature within the given zone 400. In contrast, if the brainwave electronic signal tracking device 1006 interprets the brainwaves of the occupant 1000 as indicating that the occupant 1000 is hot, the device 1006 may submit a vote on behalf of the user to decrease the temperature within the given zone 400.

The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage memory. Any and all permutations of features from the above-described embodiments are within the scope of the invention. For example, in performing processes depicted in FIGS. 7-9, the various computing platforms performing the processes may perform the various steps in a different order, may combine certain steps from the different processes, or may omit certain steps.

We claim:

1. A method of controlling a heating, ventilation, and air conditioning (HVAC) system of a building, the method comprising:

receiving, by at least one receiver in a zone of the building, a plurality of votes for a set-point temperature in the zone of the building from a plurality of mobile devices associated with the zone of the building and occupancy times of the zone of the building, wherein each of the plurality of mobile devices is associated with a corresponding user and executes a temperature control voting application, and wherein each vote is cast at a specific location according to a determined location of the respective user determined by a location of the respective mobile device;

weighting each of the plurality of votes to form a plurality of weighted votes, wherein the weighting the plurality of votes comprises giving a first vote associated with a first user of the plurality of votes a first weight and giving a second vote associated with a second user of the plurality of votes a second weight different than the first weight based on relative location of the first user to the zone of the building and relative location of the second user to the zone of the building, such that the first user vote cast within the zone of building is weighted greater than the second user vote located outside the zone of the building;

forming an aggregated plurality of votes based on an aggregation of the weighted plurality of votes; and adjusting a set-point temperature in the zone of the building according to the aggregated plurality of votes and according to the occupancy times of the zone of the building, and by controlling the HVAC system to provide the adjusted set-point temperature.

2. The method of claim 1, wherein the weighting each of the plurality of votes is further performed according to a tiered weighting system, and wherein a secondary condition of the tiered weighting system includes a seniority of a user casting each vote.

3. The method of claim 2, further comprising:

determining whether the first user casting the first vote has a higher seniority than the second user casting the second vote; and in response to determining that the first user has a higher seniority than the second user, weighting the first vote higher than the second vote.

4. The method of claim 1, wherein determining the location of a user when casting each vote includes determining a floor level elevation.

5. The method of claim 1, further comprising:
determining whether the first user casting the first vote is nearer to a receiver located within the zone of the building than the second user casting the second vote; and
in response to the determining that the first user is nearer to the receiver than the second user, weighting the first vote higher than the second vote.

6. The method of claim 1 further comprising:
determining that the first user of the plurality of users is nearest to a first receiver of the at least one receiver;
in response to determining that the first user is nearest to the first receiver, aggregating a vote received from the first user with votes received from other users located nearest to the first receiver to form a first aggregated plurality of votes; and
adjusting a set-point temperature for a first zone of the building according to the first aggregated plurality of votes, wherein the first receiver is located in the first zone of the building.

7. The method of claim 1, wherein the occupancy times of the zone of the building includes a duration of a user casting each vote within the zone of the building.

8. The method of claim 7 further comprising:
determining whether the first user casting the first vote is in the zone of the building for a longer duration than the second user casting the second vote; and
in response to determining that the first user is in the zone of the building for the longer duration than the second user, weighting the first vote higher than the second vote.

9. The method of claim 1, wherein the weighting the plurality of votes is performed according to a frequency of votes cast by respective users.

10. A temperature control voting system for controlling a heating, ventilation, and air conditioning (HVAC) system and a thermostat of a building, the temperature control voting system comprising:
the thermostat;
an HVAC controller, wherein the thermostat and/or the HVAC controller are configured to adjust a set-point temperature in at least one zone of the building;
a plurality of mobile devices, each of the plurality of mobile devices associated with a corresponding user and executing a temperature control voting application; and
at least one receiver in the at least one zone of the building, wherein the at least one receiver is configured to:
communicate with the temperature control voting application executing on the plurality of mobile devices and with the HVAC controller and/or the thermostat;
receive, from the temperature control voting application executing on the plurality of mobile devices, a plurality of votes for the set-point temperature in a zone of the at least one zone of the building, and wherein each vote is cast at a specific location according to a determined location of the respective user determined by a location of the respective mobile device;
receive, from the temperature control voting application executing on the plurality of mobile devices, a location of a mobile device corresponding to each of the plurality of votes, wherein a first location of a first vote on a first mobile device is different than a second location of a second vote on the first mobile device; and
transmit, to the HVAC controller and/or the thermostat, the plurality of votes for the set-point temperature in the zone of the building and the location corresponding to each of the plurality of votes, and
wherein the HVAC controller and/or the thermostat is configured to:
weight each of the plurality of votes to form a plurality of weighted votes, wherein weighting the plurality of votes comprises giving a first vote associated with a first user of the plurality of votes a first weight and giving a second vote associated with a second user of the plurality of votes a second weight different than the first weight based on relative location of the first user to the zone of the building and relative location of the second user to the zone of the building, such that the first user vote cast within the zone of building is weighted greater than the second user vote located outside the zone of the building;
form an aggregated plurality of votes based on an aggregation of the weighted plurality of votes; and
adjust the set-point temperature in the zone of the building according to the aggregated plurality of votes and according to occupancy times of the zone of the building, and by controlling the HVAC system to provide the adjusted set-point temperature.

11. The temperature control voting system of claim 10, wherein the HVAC controller and/or the thermostat is further configured to:
weight the plurality of votes according to a seniority of a user casting each vote.

12. The temperature control voting system of claim 11, wherein the HVAC controller and/or the thermostat is further configured to:
determine whether the first user casting the first vote has a higher seniority than the second user casting the second vote; and
in response to determining that first user does have the higher seniority than the second user, weight the first vote higher than the second vote.

13. The temperature control voting system of claim 10, wherein the HVAC controller and/or the thermostat is further configured to:
determine whether the first user casting the first vote is nearer to the at least one receiver than the second user casting the second vote; and
in response to the determining that the first user is nearer to the at least one receiver than the second user, weight the first vote higher than the second vote.

14. The temperature control voting system of claim 10, wherein the HVAC controller and/or the thermostat is further configured to:
determine that a first mobile device of the plurality of mobile devices is nearest to a first receiver of the at least one receiver;
in response to determining that the first mobile device is nearest to the first receiver, aggregate a vote received from the first mobile device with votes from other mobile devices that are also located nearest to the first receiver to form a first aggregated plurality of votes; and
adjust a set-point temperature for a first zone of the building according to the first aggregated plurality of votes, wherein the first receiver is located in the first zone of the building.

15. The temperature control voting system of claim 10, wherein the HVAC controller and/or thermostat is further configured to:
  weight the plurality of votes according to a duration of a user casting each vote within the at least one zone of the building.

16. The temperature control voting system of claim 10, wherein the HVAC controller and/or thermostat is further configured to:
  weight the plurality of votes according to a frequency of votes cast of a user casting each vote.

* * * * *

UNITED STATES PATENT AND TRADEMARK OFFICE
CERTIFICATE OF CORRECTION

| | | |
|---|---|---|
| PATENT NO. | : 9,989,944 B2 | Page 1 of 1 |
| APPLICATION NO. | : 14/718494 | |
| DATED | : June 5, 2018 | |
| INVENTOR(S) | : John Henneberger et al. | |

It is certified that error appears in the above-identified patent and that said Letters Patent is hereby corrected as shown below:

On the Title Page

Item (73):
Please delete "Portable Comfort Corporation LLC" and insert -- Portable Comfort LLC --

Signed and Sealed this
Fourteenth Day of February, 2023

Katherine Kelly Vidal
*Director of the United States Patent and Trademark Office*